(12) United States Patent
Topol et al.

(10) Patent No.: US 9,540,938 B2
(45) Date of Patent: Jan. 10, 2017

(54) PYLON MATCHED FAN EXIT GUIDE VANE FOR NOISE REDUCTION IN A GEARED TURBOFAN ENGINE

(71) Applicant: United Technologies Corporation, Hartford, CT (US)

(72) Inventors: David A. Topol, West Hartford, CT (US); Glen E. Potter, Vernon, CT (US); Flavien L. Thomas, Moodus, CT (US)

(73) Assignee: United Technologies Corporation, Farmington, CT (US)

( * ) Notice: Subject to any disclaimer, the term of this patent is extended or adjusted under 35 U.S.C. 154(b) by 765 days.

(21) Appl. No.: 13/721,498

(22) Filed: Dec. 20, 2012

(65) Prior Publication Data

US 2014/0219792 A1 Aug. 7, 2014

Related U.S. Application Data

(60) Provisional application No. 61/707,180, filed on Sep. 28, 2012.

(51) Int. Cl.

| F01D 9/04 | (2006.01) |
|---|---|
| F01D 5/14 | (2006.01) |
| F04D 29/54 | (2006.01) |
| F02C 7/045 | (2006.01) |

(52) U.S. Cl.
CPC ............... *F01D 9/041* (2013.01); *F01D 5/142* (2013.01); *F01D 5/145* (2013.01); *F02C 7/045* (2013.01); *F04D 29/544* (2013.01); *F05D 2250/31* (2013.01); *F05D 2260/961* (2013.01); *Y02T 50/673* (2013.01); *Y10T 29/49245* (2015.01)

(58) Field of Classification Search
CPC ...... F04D 19/002; F04D 29/544; F01D 5/148; F01D 9/041; F05D 2240/122; F05D 2250/38; F05D 2260/961
See application file for complete search history.

(56) References Cited

U.S. PATENT DOCUMENTS

| 4,077,206 A | 3/1978 | Ayyagari |
| 5,246,339 A | 9/1993 | Bengtsson et al. |
| 5,520,511 A * | 5/1996 | Loudet .................... F01D 5/148 415/148 |
| 6,439,840 B1 | 8/2002 | Tse |
| 6,554,564 B1 | 4/2003 | Lord |
| 7,018,172 B2 | 3/2006 | Prasad et al. |

(Continued)

OTHER PUBLICATIONS

International Search Report and Written Opinion for PCT Application No. PCT/US2013/061098 mailed on Dec. 17, 2013.

(Continued)

*Primary Examiner* — Ninh H Nguyen
(74) *Attorney, Agent, or Firm* — Carlson, Gaskey & Olds, P.C.

(57) ABSTRACT

A disclosed fan section of a gas turbine engine includes a fan rotor having a plurality of fan blades and a duct defining a passageway aft of the fan rotor. A fan exit guide vane is disposed within the duct downstream of the fan blades. The fan exit guide vane includes a plurality of exit guide vanes positioned downstream of the fan rotor with at least two of the plurality of exit guide vanes including different aft geometries for guiding airflow through the passage to reduce pressure distortions at the fan blades.

4 Claims, 4 Drawing Sheets

(56) References Cited

U.S. PATENT DOCUMENTS

| | | |
|---|---|---|
| 7,114,911 B2 * | 10/2006 | Martin .................. F04D 29/563 |
| | | 415/1 |
| 7,118,331 B2 | 10/2006 | Shahpar |
| 7,334,998 B2 | 2/2008 | Jones et al. |
| 7,540,354 B2 | 6/2009 | Morin et al. |
| 7,607,287 B2 | 10/2009 | Reba et al. |
| 9,062,552 B2 * | 6/2015 | Holmes .................. F01D 9/042 |
| 9,091,174 B2 * | 7/2015 | Bagnall .................. F01D 5/141 |
| 2004/0258520 A1 * | 12/2004 | Parry ........................ F01D 5/10 |
| | | 415/209.1 |
| 2007/0147992 A1 | 6/2007 | Yu et al. |
| 2009/0320488 A1 | 12/2009 | Gilson et al. |
| 2011/0211947 A1 | 9/2011 | Clemen |
| 2011/0255964 A1 | 10/2011 | Clemen |
| 2012/0222397 A1 | 9/2012 | Smith et al. |

OTHER PUBLICATIONS

U.S. Appl. No. 13/408,382, filed Feb. 29, 2012 entitled "Geared Gas Turbine Engine With Reduced Fan Noise".
International Preliminary Report on Patentability for PCT Application No. PCT/US2013/061098, mailed on Apr. 9, 2015.
Shrinivas, G.N. et al., "OGV Tailoring to Alleviate Pylon-OGV-Fan Interaction" Presented at the International Gas Turbine and Aeroengine Congress and Exposition, pp. 1-9, Jun. 5-8, 1995.
European Search Report for EP Application No. 13841971.8 dated Jun. 29, 2016.

\* cited by examiner

PYLON MATCHED FAN EXIT GUIDE VANE FOR NOISE REDUCTION IN A GEARED TURBOFAN ENGINE

CROSS REFERENCE TO RELATED APPLICATION

This application claims priority to U.S. Provisional Application No. 61/707,180 filed on Sep. 28, 2012.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. A speed reduction device such as an epicyclical gear assembly may be utilized to drive the fan section such that the fan section may rotate at a speed different than the turbine section and increase overall propulsive efficiency of the engine.

A fan exit guide vane is generally provided aft of the fan and forward of structural components within bypass passages such as an upper bifurcation that include structures for attaching the engine to the airframe. The combination of the fan exit guide vane and structural components aft of the fan can create an unsteady pressure distortion at the fan blade. Relationships between the rotating fan and components within the bypass duct can contribute to the propagation of noise from the nacelle. The unsteady pressure distortion patterns at the fan blade can generate undesirable levels of noise.

Accordingly, it is desirable to design and develop a fan exit guide vane that reduces unsteady distortion patterns and prevent propagation of noise from the nacelle.

SUMMARY

A fan section of a gas turbine engine according to an exemplary embodiment of this disclosure, among other possible things includes a fan rotor including a plurality of fan blades, a duct circumscribing the fan rotor and defining a passageway aft of the fan rotor, and a fan exit guide vane assembly including a plurality of exit guide vanes positioned downstream of the fan rotor. Each of the plurality of exit guide vanes includes a common forward geometry and at least two of the plurality of exit guide vanes include different aft geometries.

In a further embodiment of the foregoing fan section, the plurality of exit guide vanes are spaced equally about an inner circumference of the duct.

In a further embodiment of any of the foregoing fan sections, each of the plurality of exit guide vanes include a leading edge disposed at a common axial location within the duct.

In a further embodiment of any of the foregoing fan sections, includes a component disposed within the duct downstream of the fan exit guide vane assembly. The aft geometry is selected according to a position of an exit guide vane relative to the component.

In a further embodiment of any of the foregoing fan sections, each of the exit guide vanes includes a common forward geometry and at least some of the plurality of exit guide vanes includes a different aft geometry.

In a further embodiment of any of the foregoing fan sections, the aft geometry is selected from a predefined family of aft geometries.

A gas turbine engine according to an exemplary embodiment of this disclosure, among other possible things includes a fan including a plurality of fan blades rotatable about an axis, a duct defining a passageway aft of the fan, a structure disposed within the duct, and a fan exit guide vane assembly including a plurality of exit guide vanes positioned downstream of the fan blades. Each of the plurality of exit guide vanes include a common forward geometry and at least two of the plurality of exit guide vanes include different aft geometries corresponding to a location of the structure disposed within the duct.

In a further embodiment of the foregoing gas turbine engine, the plurality of exit guide vanes are spaced equally circumferentially within the duct.

In a further embodiment of any of the foregoing gas turbine engines, each of the plurality of exit guide vanes include a leading edge disposed at a common axial location within the duct.

In a further embodiment of any of the foregoing gas turbine engines, each of the exit guide vanes includes a common forward geometry and at least some of the plurality of exit guide vanes includes a different aft geometry.

In a further embodiment of any of the foregoing gas turbine engines, the aft geometry is selected from a predefined family of aft geometries determined to provide a desired aerodynamic performance.

In a further embodiment of any of the foregoing gas turbine engines, includes a geared architecture driven by a turbine section for rotating the fan about the axis.

A method of assembling a fan exit guide vane assembly according to an exemplary embodiment of this disclosure, among other possible things includes defining an airfoil shape that provides desired performance, defining a family of airfoils shapes including a common forward geometry and differing aft geometry, determining an acoustic performance characteristic for each of a plurality of circumferential positions, selecting an airfoil shape from the family of airfoil shapes for each circumferential position of the fan exit guide vane assembly based on an acoustic performance characteristic, and installing vanes at each circumferential position of a fan exit guide vane assembly including the selected airfoils based on the acoustic performance characteristic.

In a further embodiment of the foregoing method, includes defining a common axial position of a leading edge of each of the exit guide vanes, and a uniform circumferential spacing between each of the exit guide vanes.

In a further embodiment of any of the foregoing methods, includes selecting the airfoil shape based on a position of the exit guide vane relative to a structure disposed within a duct downstream of the fan exit guide vane.

In a further embodiment of any of the foregoing methods, includes selecting the airfoil shape based on a pressure distortion pattern of a fan.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
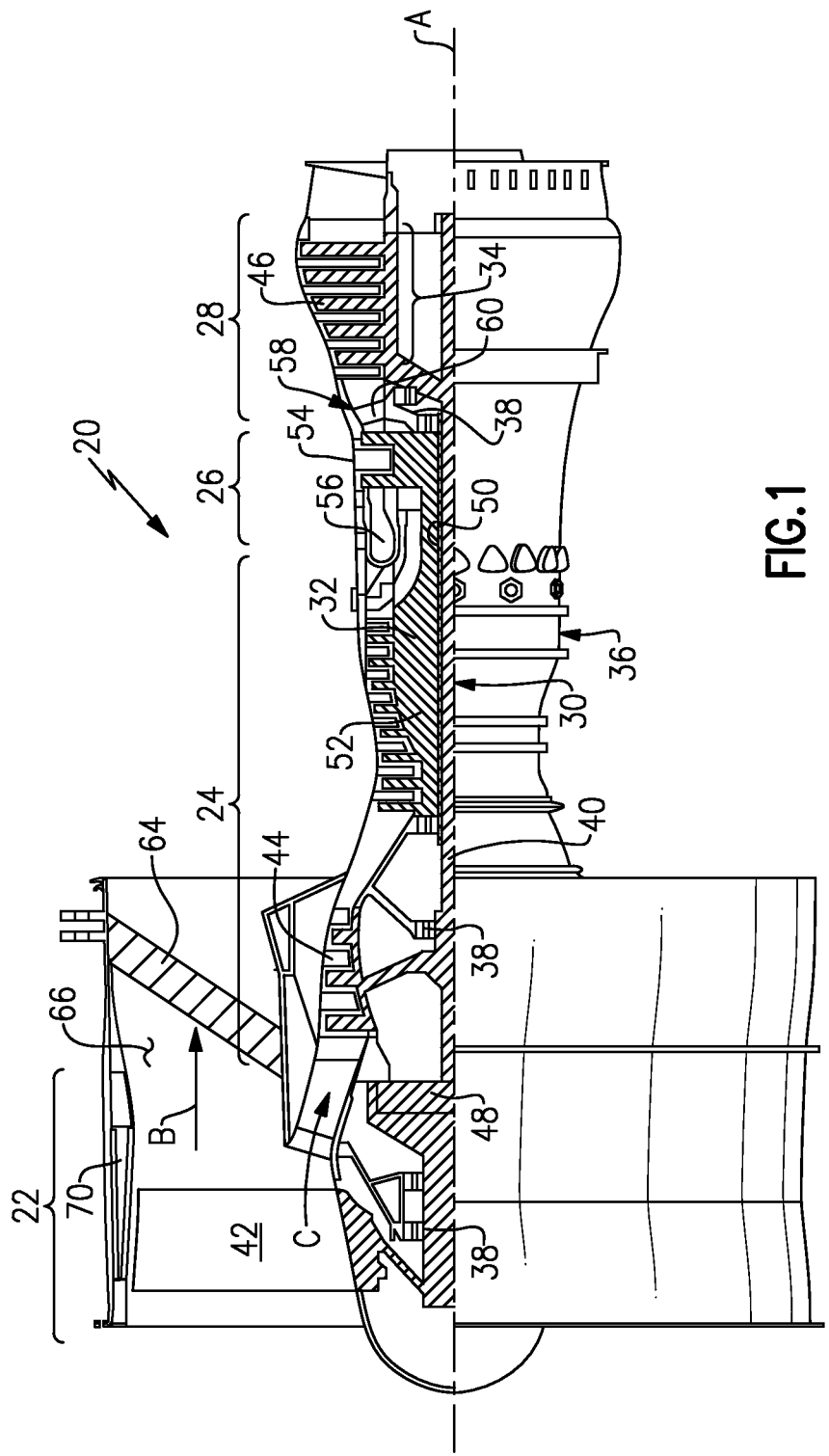
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core flow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example gas turbine engine 20 also includes a duct 66 within which is mounted a fan exit guide vane assembly 64. The duct 66 extends from a point forward of the fan blades 42 to a point aft of the fan blades 42. The fan exit guide vane assembly 64 is disposed aft of the fan blades 42 and conditions airflow through the duct 66 downstream of the fan blades 42.

Figure 2:
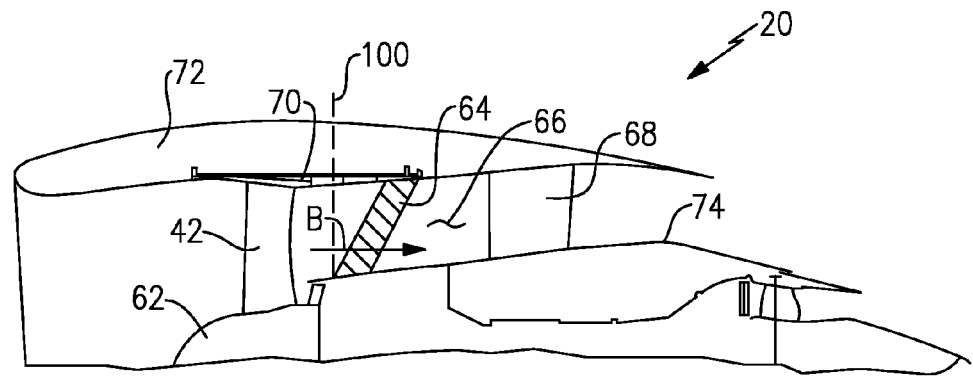
FIG. 2 is a schematic view of portions of a duct for an example gas turbine engine.

Referring to FIG. 2 with continued reference to FIG. 1, the example gas turbine engine 20 includes an outer nacelle 72 circumscribed about a core nacelle 74. The duct 66 is defined between the outer nacelle 72 and the core nacelle 74. The fan 42 is supported on a fan rotor 62 that rotates about the engine axis A.

The fan exit guide vane assembly 64 is disposed downstream of the rotating fan blades 42. Further downstream from the fan exit guide vane 64 is a bifurcation 68. As appreciated, several structures such as the example bifurcation 68 are supported within the duct 66. In this example, the bifurcation 68 provides the means for supporting the gas turbine engine 20 on a pylon structure of an airframe. As appreciated, although a bifurcation 68 is shown and illustrated by way of example, other structures within the duct 66 may affect airflow.

Figure 3:
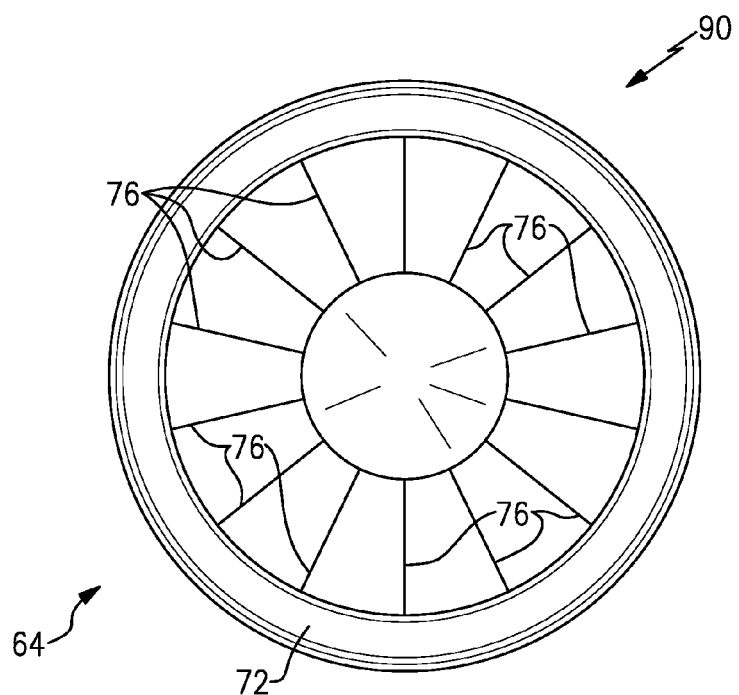
FIG. 3 is a schematic view of an example fan exit guide vane assembly.

Referring to FIG. 3 with continued reference to FIG. 2, the example fan exit guide vane assembly 64 includes a plurality of exit guide vanes 76 that are disposed about an inner circumference of the outer nacelle structure 72. In this example, a fan case 70 is supported radially outward of the fan blades 42. The example fan exit guide vanes 76 extend between the core nacelle 74 to the fan case 70.

The example fan exit guide vanes 76 are disposed about the circumference in uniformly spaced circumferential increments. Each of the leading edges or forward most portions of each of the guide vanes 76 are circumferentially spaced about the outer nacelle structure 72 and fan case 70.

The example fan exit guide vane assembly 64 includes exit guide vanes 76 that define an exit guide vane pattern. The pattern is comprised of the various exit guide vanes 76 disposed in a specific pattern and orientation relative to each other and disposed about a circumference of the duct 66.

Figure 4:
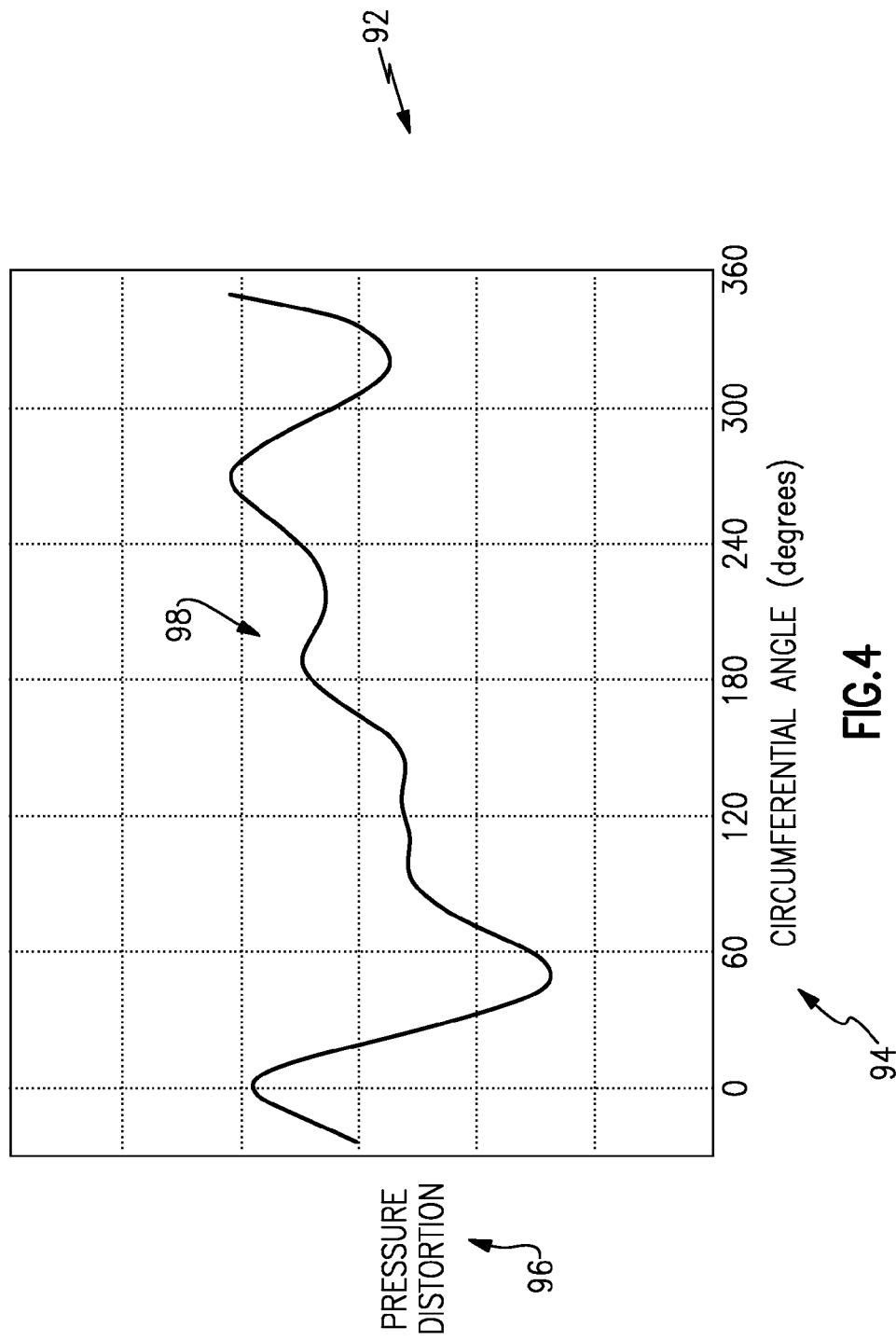
FIG. 4 is a graph representing pressure distortion over a circumferential angle at the fan trailing edge.

Referring to FIG. 4 with continued reference to FIG. 2, the operation of the fan blades 42 that rotate within the outer nacelle structure 72 generates the bypass flow B through the duct 66. The bifurcation 68 in addition to the fan exit guide vane 64 can create a static pressure distortion profile at the fan blades 42. The distortion profile illustrated in graph 92 is not uniform about the circumference of the duct 66. The graph 92 includes a profile 98 that represents an unsteady distortion pattern at the fan blade 42. The unsteady distortion pattern at the fan blades 42 as is shown by way of example according to graph 92, creates unsteady distortion patterns that can create noise at the blade passing frequency.

The generated noise is created by the distortion pattern that is caused by rotation of the blades 42 in conjunction with the obstructions within the duct 66 such as the example bifurcation 68 along with the fan exit guide vane assembly 64.

Modification of the specific configuration of airfoils comprising each of the individual guide vanes 76 can limit distortion at the fan blades 42 thereby reducing interaction noise generated by the distortion interaction with the fan blades from the gas turbine engine 20. The airfoils for each of the guide vanes 76 should also be similar enough to maintain a desired property known as "cut-off" for the isolated fan/fan exit guide vane interaction noise source. The configuration of the guide vanes 76 can maintain noise cutoff of the isolated fan/fan exit guide vane interaction by keeping the guide vanes similar enough, so as to cause noise generated by this noise source at specific frequencies to decay exponentially in the nacelle. Moreover, the disclosed configuration of guide vanes 76 provides for the general cutoff of isolated fan/fan exit guide vane interaction noise for specific noise frequencies and causes the noise to decay exponentially in the nacelle thus significantly reducing the amount of noise propagating out of the nacelle.

Figure 5:
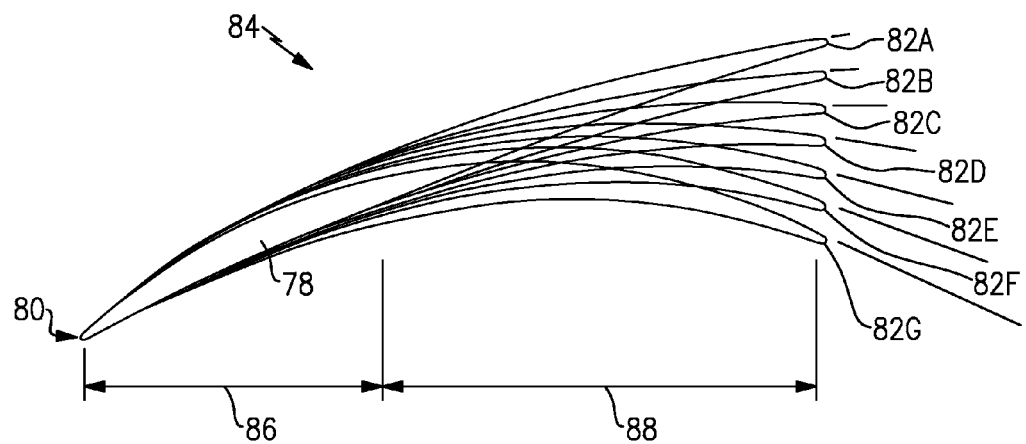
FIG. 5 is a schematic representation of a family of airfoils for the example fan exit guide vane assembly.

Referring to FIG. 5, an airfoil family 84 is schematically illustrated and includes a plurality of exit guide vane airfoils 84 that have different configurations. A specific one of the family of airfoils 84 is selected for each circumferential position about the fan exit guide vane assembly 64 to compensate for the distortions illustrated by the graph 92 shown in FIG. 4.

In this example, the family of airfoils 84 includes a plurality of different airfoils 84 of different vane cambers. A forward portion 86 of each of the airfoils 84 is generally common throughout the family 84. An aft portion 88 is generally different and provides the desired variation or turning of airflow relative to downstream obstructions. Each of the airfoils 78 includes a common leading edge 80. Each specific airfoil configuration includes different aft portions 88. In this example, aft portions 82a, 82b, 82c, 82d, 82e, 82f, and 82g all provide different a different exit angle by varying a circumferential position of the vane trailing edge relative to the vane leading edge and are utilized in conjunction with the known pressure distortion pattern provided by graph 92 to tailor and minimize the acoustic signature produced by the fan blades 42. Additionally, maintaining a generally common forward portion provides the ability to maintain the "cutoff" of the noise interaction between the fan and fan exit guide vanes.

In this example, the example fan exit guide vane assembly 64 is constructed by first determining desired structural and aerodynamic features required to perform as desired. Once the aerodynamic and structural requirements are fulfilled by the design for the example fan exit guide vane 64, a family of airfoils as is indicated at 84 is generated that maintain the aerodynamic and structural requirements while also providing a means for minimizing the back pressure distortion at the fan blades 42 due to the fan exit guide vanes and obstructions in the duct. This reduces fan noise generated by the interaction of the distortion profile 98 with the fan while keeping the isolated fan/fan exit guide vane interaction generally cutoff.

Each of the family of airfoils 84 within the fan exit guide vane assembly 64 will include the leading edge 80 that is uniformly spaced about the circumference of the duct 66. In other words, a leading edge portion of each of the specific guide vanes 76 will be uniformly spaced evenly about the circumference of the bypass ducts 66. Moreover, an axial location of a leading edge of each of the individual guide vanes 76 will be maintained within a common plane 100 (FIG. 2).

Once the axial location along with the circumferential spacing has been determined, a specific one of the plurality of airfoils within the family of airfoils 84 will be selected for each circumferential position of the fan exit guide vane assembly 64. The specific airfoil for a specific circumferential position of the bypass duct is selected according to the profile 98 illustrated by graph 92. The specific vane camber and thereby air turning properties of each of the airfoils 84 that make up the plurality of airfoils for the example fan exit guide vane 64 are selected to reduce the pressure distortions encountered at the fan blades 42 to reduce acoustic signature due to the distortion while generally maintaining the acoustic cutoff of the isolated fan/fan exit guide vane interaction.

It should be understood, that the method of selecting a specific one of the family of airfoils 84 may be performed by a computing device. In terms of hardware architecture, such a computing device can include a processor, a memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Figure 6:
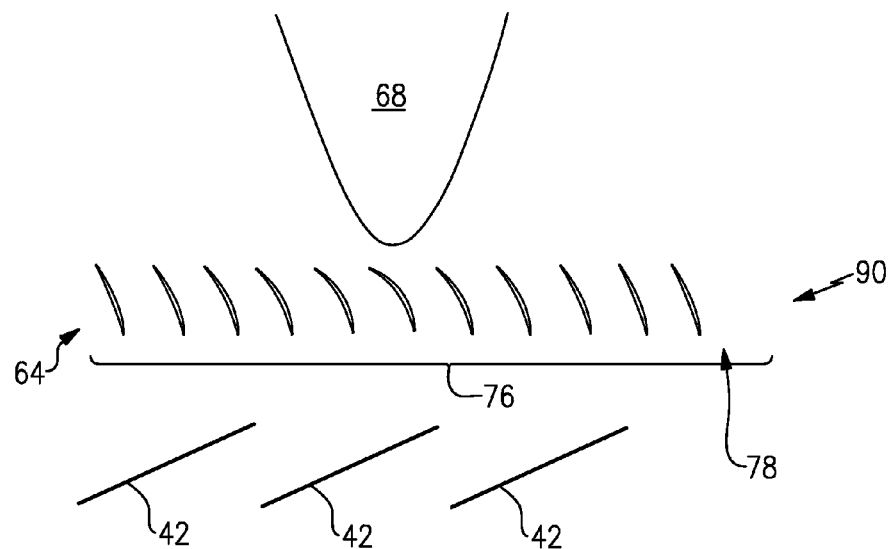
FIG. 6 is a schematic view of an example fan exit guide vane assembly.

Referring to FIG. 6, an example schematic representation of the fan blade interaction with the fan exit guide vane assembly 64 is illustrated with respect to an upper bifurcation 68. As is shown, a specific pattern 90 is provided for the exit guide vane 64. The pattern 90 comprises a plurality of individually selected airfoils 84 each having a different amount of camber to provide different turning in response to the fan pressure distortions illustrated by the profile 98 of the graph 92. As appreciated, each fan exit guide vane 76 includes a unique curvature or aft portion 88 and is selected responsive to its relative position with respect to the bifurcation 68 or other obstructions present in the duct.

The flow in a direction indicated by arrow 78 through the fan blades 42 is drawn through the fan exit guide vane 64 having a specific pattern 90 of individual guide vanes 76 that directs air relative to the obstruction to minimize both aerodynamic and acoustic disturbances. In this example the obstruction is the upper bifurcation 68 and the fan exit guide vane minimizes the acoustic noise generated by interaction between the fan 42, the exit guide vane assembly 64, and the downstream obstructions within the duct 66.

Accordingly, the example fan exit guide vane assembly 64 reduces generated acoustic noise caused by the interaction between the fan blades 42, the fan exit guide vane 64, and obstructions within the duct 66.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of assembling a fan exit guide vane assembly comprising:
    defining an airfoil shape that provides desired performance;
    defining a family of airfoils shapes including a common forward geometry and differing aft geometry;
    determining an acoustic performance characteristic for each of a plurality of circumferential positions;
    selecting an airfoil shape from the family of airfoil shapes for each circumferential position of the fan exit guide vane assembly based on an acoustic performance characteristic;
    defining a common axial position of a leading edge of each of the exit guide vanes and a common axial spacing of a trailing edge of each of the exit guide vanes from the leading edge; and
    installing vanes at each circumferential position of a fan exit guide vane assembly including the selected airfoils based on the acoustic performance characteristic.

2. The method as recited in claim 1, including defining uniform circumferential spacing between each of the exit guide vanes.

3. The method as recited in claim 1, including selecting the airfoil shape based on a position of the exit guide vane relative to a structure disposed within a duct downstream of the fan exit guide vane.

4. The method as recited in claim 1, including selecting the airfoil shape based on a pressure distortion pattern of a fan.

* * * * *